United States Patent
Skirmont et al.

(10) Patent No.: US 6,839,359 B2
(45) Date of Patent: *Jan. 4, 2005

(54) METHOD AND APPARATUS FOR MAPPING DATA PACKETS BETWEEN LINES OF DIFFERING CAPACITY AT A ROUTER INTERFACE

(75) Inventors: David Skirmont, Redwood City, CA (US); Jeff Cuppett, Mountain View, CA (US); Russ Tuck, San Jose, CA (US)

(73) Assignee: Pluris, Inc., Cupertino, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 10/152,515

(22) Filed: May 20, 2002

(65) Prior Publication Data

US 2002/0136208 A1 Sep. 26, 2002

Related U.S. Application Data

(63) Continuation of application No. 09/594,300, filed on Jun. 14, 2000, now Pat. No. 6,385,209.

(51) Int. Cl.[7] .............................. H04J 3/00; H04L 12/58
(52) U.S. Cl. ....................... 370/419; 370/401; 370/413; 370/392; 370/907; 379/900
(58) Field of Search ........................ 370/235, 351–353, 370/389, 392, 401, 412, 413, 395.1, 395.5, 419, 465, 475, 498, 536, 542, 543, 907; 379/900

(56) References Cited

U.S. PATENT DOCUMENTS

| | | | |
|---|---|---|---|
| 5,555,256 A | * | 9/1996 | Calamvokis ................ 370/399 |
| 6,160,819 A | * | 12/2000 | Partridge et al. ........... 370/474 |
| 6,161,144 A | * | 12/2000 | Michels et al. ............. 709/238 |
| 6,246,668 B1 | * | 6/2001 | Kusyk ......................... 370/228 |
| 6,298,038 B1 | * | 10/2001 | Martin et al. ............... 370/216 |
| 6,359,879 B1 | * | 3/2002 | Carvey et al. .............. 370/351 |
| 6,385,209 B1 | | 5/2002 | Skirmont et al. |
| 6,430,201 B1 | * | 8/2002 | Azizoglu et al. ........... 370/535 |
| 6,501,734 B1 | * | 12/2002 | Yu et al. ..................... 370/236 |
| 6,556,593 B1 | * | 4/2003 | Herkersdorf et al. ....... 370/532 |
| 6,587,470 B1 | * | 7/2003 | Elliot et al. ................. 370/404 |
| 6,604,147 B1 | * | 8/2003 | Woo .......................... 709/240 |
| 6,628,657 B1 | * | 9/2003 | Manchester et al. ..... 370/395.1 |

OTHER PUBLICATIONS

Bagheri et al, 10Gb/s Framer/Demultiplexer IC for SONET STS–192 Applications, IEEE 1995, pp. 427–430.*

* cited by examiner

Primary Examiner—Hassan Kizou
Assistant Examiner—Ahmed Elallam
(74) Attorney, Agent, or Firm—Donald R. Boys; Central Coast Patent Agency, Inc.

(57) ABSTRACT

A line card for a data packet router interfaces to a high-speed standard data link, and has a first portion interfacing to the router and having a plurality of slower ports, and a second portion having a framer compatible with and coupled to the data link. The framer is coupled through an ingress and an egress data path between the framer and the slower ports, each with separate ingress buffers and egress buffers for each port. An interface control circuit controls data packet transfers between the slower ports and the framer in both directions. In a preferred embodiment a function is used by the control circuit to map packets from the link to the ports, using keys extracted from the incoming packets. For an IP packet the key is the source address, destination address (SA/DA)pair, which constrains packets for same IP conversations to be routed by the same path.

13 Claims, 8 Drawing Sheets

Problem: How to manage to provide load-balancing and single-path routing of IP packets.

Problem: How to manage to provide load-balancing and single-path routing of IP packets.

METHOD AND APPARATUS FOR MAPPING DATA PACKETS BETWEEN LINES OF DIFFERING CAPACITY AT A ROUTER INTERFACE

This Application is a continuation of Patent Application Ser. No. 09/594,300, filed on Jun. 14, 2000, now U.S. Pat. No. 6,385,209.

FIELD OF THE INVENTION

The present invention is in the area of routing data packets in data packet networks such as the well-known Internet, and pertains more particularly to methods and apparatus for implementing a single higher-capacity port from a plurality of lower-capacity ports.

BACKGROUND OF THE INVENTION

At the time of the present patent application demand for increased data capacity and efficiency in Internet traffic continues to increase dramatically as more individuals and businesses increase their use of the Internet. The ever-increasing demand also drives development of equipment for the Internet such as data packet routers. A number of enterprises are developing routers that are capable of faster and higher capacity handling of data packets.

The Internet, operating globally, comprises components from a wide variety of companies and organizations. It is, of course, necessary that such equipment conform to certain hardware and connection standards and operate by certain data transfer standards and protocols. These standards are all well known the skilled artisan.

In the Internet art at the time of this application a common standard for links between routers is the SONET OC-48c standard, which provides a data capacity of 2.5 gigabits per second (Gb/s). The increasing demand for faster routing has led to a higher-capacity interconnection OC-192c standard with a data capacity four times higher, or 10 Gb/s. Those purveyors of router equipment conforming to the OC-48c standard have an incentive to upgrade to the higher-capacity standard. One way to upgrade a router having OC-48c ports to interface to OC-192c links, is to develop new line cards with OC-192c compatible ports, and interface circuitry to handle the higher-speed interconnecting links. Developing the new equipment is far from trivial, and requires considerable time and expense.

The present inventors have developed a new and unique method and apparatus for interfacing router equipment originally developed and devoted to the OC-48c standard to the newer, higher-speed OC-192c links.

SUMMARY OF THE INVENTION

In a preferred embodiment of the present invention, in a data packet router, a line card for interfacing to a standard data link having a first transmission capacity is provided, comprising a first portion interfacing to the router and having a plurality of ports or packet processing engines each with a transmission capacity less than that of the standard data link; and a second portion having a framer compatible with the standard data link coupled to the standard data link, an ingress and an egress data path between the framer and the slower ports or engines, each with separate ingress buffers and egress buffers for each slower port, and an interface control circuit controlling data packet transfers between the slower ports and the framer in both directions. The standard data link may be one of OC-192c-compatible or 10 Gigabit Ethernet compatible, and the slower ports may be OC-48c ports.

In a preferred embodiment the interface control circuit extracts a key from incoming packets from the standard data link, processes the extracted key for each packet, and uses selected bits of the result for the packet to map the packet to an individual one of the slower ports. The processing may be by such as a hashing function. The key for an incoming Internet Protocol (IP) packet in one embodiment is the source address, destination address (SA/DA) pair, producing a unique processed result, such that all packets having a common SA/DA pair are routed by the same slower port, using a selected pair of bits from the result. Labels of multi-protocol label-switching (MPLS) packets may be processed to map MPLS packets to the slower ports, and packets other than Internet Protocol (IP) and multi-protocol label-switching (MPLS) packets may be processed by point-to-point protocol (PPP) code.

In some embodiments of the line card the control circuit monitors A buffer content for the ingress buffers, and reroutes packets from a first buffer to a second buffer, based on the first buffer content being above a pre-set threshold. The egress buffers may be provided in a capacity to hold at least two maximum-size packets, and the control circuit pulls a packet from a buffer for the framer only if the buffer contains a complete packet.

In another aspect of the invention, on a line card for a data packet router, a method for routing data packets from a standard data link having a first transmission capacity to a plurality of slower ports or packet processing engines is provided, the method comprising the steps of (a) extracting a key from each incoming packet; (b) producing a unique data string from the key; (c) selecting bits from the data string; and (d) mapping the packets to the slower ports according to the binary value of the selected bits.

In some embodiments of the method the standard link is compatible with SONET OC 192c protocol, and the slower ports are compatible with SONET OC 48c protocol. Further, the unique data string may produced by a hashing function. Also in some embodiments, in step (a), the key for an incoming Internet Protocol (IP) packet is the source address, destination address (SA/DA) pair, producing a unique result, such that all packets having a common SA/DA pair are routed by the same slower port, using selected bits from the unique result. The unique result may be produced from the SA/DA pair by a hashing function.

In some embodiments, in step (a), labels of multi-protocol label-switching (MPLS) packets are selected as the key. Also in some embodiments, in step (a), the key for packets other than Internet Protocol (IP) and multi-protocol label-switching (MPLS) packets may be point-to-point protocol (PPP) code. Packets may be routed to the slower ports through ingress buffers dedicated to the ports.

In some embodiments buffer content for the ingress buffers is monitored, and packets are rerouted from a first buffer to a second buffer, based on the first buffer content being above a pre-set threshold. An egress buffer may be provided for each slower port in a capacity to hold at least two maximum-size packets, and a packet is pulled from an egress buffer for the framer only if the buffer contains a complete packet.

In yet another aspect of the invention a method for enabling a data packet router line card having a plurality of ports or packet-processing engines to receive on a data link having a capacity greater than the capacity of any one of the ports is provided, comprising the steps of (a) adding a framer to the card for coupling to the data link; (b) coupling the framer to slower ports through an interface control circuit and buffers dedicated one-to-one to each port; (c) extracting a key from each incoming data packet; and (d) using the key with a mapping function to map each packet to an individual ingress buffer, and hence to an individual port.

In this method in some embodiments the plurality of ports are each SONET OC-48c compatible, and the data link is OC-192c compatible or 10 Gigabit Ethernet compatible. In step (d), the mapping function may be a hashing function producing a unique bit map for each extracted key, and specific bits of the bitmap are selected and used to map the packet to individual ones of the ports. The key for an incoming Internet Protocol (IP) packet is, in a preferred embodiment, the source address, destination address (SA/DA) pair, producing a unique result, such that all packets having a common SA/DA pair are routed by the same port, using selected bits from the hash result.

In some embodiments labels of multi-protocol label-switching (MPLS) packets are hashed to map MPLS packets to the ports, and packets other than Internet Protocol (IP) and multi-protocol label-switching (MPLS) packets are hashed by point-to-point protocol (PPP) code. Also in some embodiments the control circuit monitors buffer content for the ingress buffers, and reroutes packets from a first buffer to a second buffer, based on the first buffer content being above a pre-set threshold. Further, there may be a step for coupling the framer to the ports also through individual egress buffers each having a capacity to hold at least two maximum-size packets, and wherein the control circuit pulls a packet from an egress buffer for the framer only if the buffer contains a complete packet.

In embodiments of the present invention taught in enabling detail below, for the first time apparatus and methods are contributed for mapping a fast link to slower ports or engines, and for ensuring as well that IP packets all travel by the same path.

DESCRIPTION OF THE PREFERRED EMBODIMENTS

Figure 1:
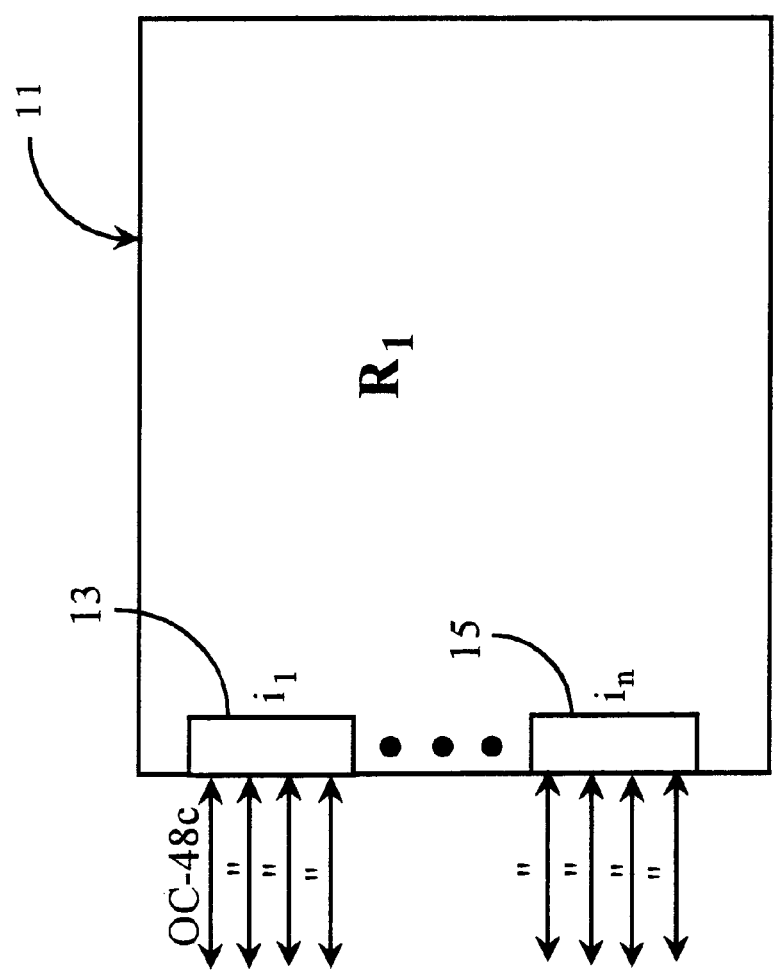
FIG. 1 is a block diagram of an exemplary router with conventional data interfaces in the prior art.

FIG. 1 is a block diagram of an exemplary router 11 with conventional data interfaces 13 and 15 as used in the prior art. Interfaces 13 and 15 in this example are line cards each having four OC-48c standard ports capable a data rate of 2.5 Gb/s each. Line card 13 is labeled $i_1$ and line card 15 is labeled $I_n$, illustrating that there may multiple line cards in a router.

Figure 2:
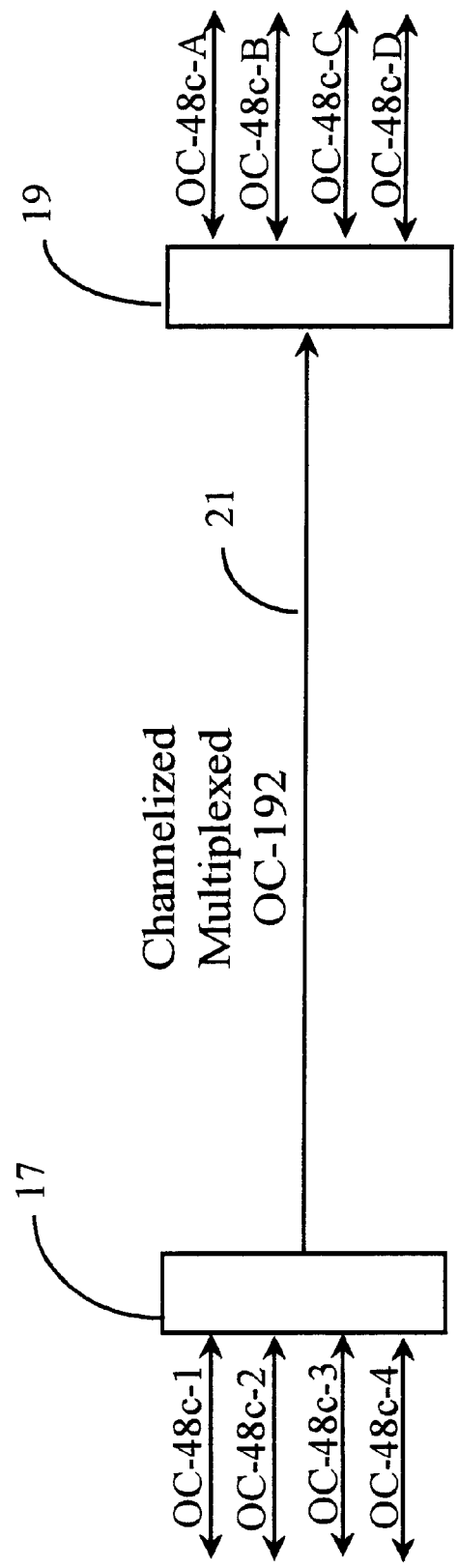
FIG. 2 is a diagram illustrating a prior art approach to interfacing an OC-192 link to OC-48c ports.

FIG. 2 is a diagram illustrating a prior art approach to interfacing an OC-192 link to OC-48c ports. In this approach there are two end-blocks 17 and 19, each interfacing to four OC-48c ports. A single line 21 joins the two end-blocks, labeled OC-192. In this solution data packets in one direction, for example arriving at block 17 from OC-48 ports 1 through 4, are multiplexed onto line 21 to be transmitted to block 19. Similarly, data packets arriving from ports OC-48 A through D at block 19 are multiplexed onto line 21 to be transmitted to block 17 and hence onto to ports OC48 1 through 4. In this scheme line 21 is operated, for example, a time division multiple access link, wherein each port pair has a transmit and receive time slice. Port 1 may be paired with port A for example, and receive one-forth of a time cycle for transmitting and receiving.

Figure 3:
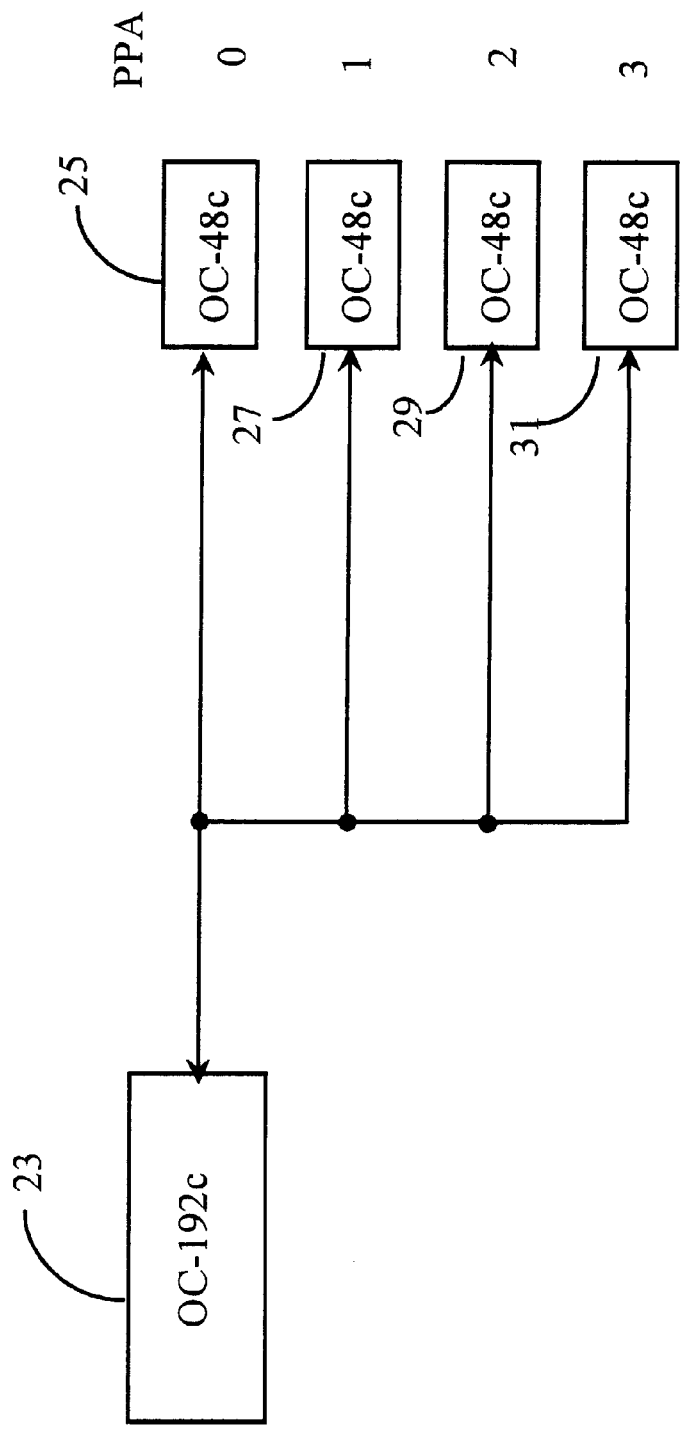
FIG. 3 is a diagram illustrating the problem of connecting an OC-192c link to OC-48c ports.

Note that the data on line 21 is strictly controlled and constrained, so this solution does not solve the problem of how to interface OC-48c ports efficiently to an unstructured OC-192c line, which is the problem illustrated in general terms in FIG. 3. FIG. 3 shows an unstructured OC-192c source/receiver 23 connected to four OC-48c ports 25–31, labeled also as ports 0, 1, 2, and 3. In this example each of the OC-48c ports is a packet-processing application-specific integrate circuit (ASIC), referred to by the inventors as a packet processing ASIC, or PPA. The simple point-to-point connection is, of course, impractical, because there is no way to manage apportioning data packets among the four PPAs.

There are really two problems, or desirable results, illustrated by FIG. 3. One is that it would be desirable to balance traffic among the four PPAs. The other is that it would also be highly desirable if IP packets having the same source and destination could be routed by the same physical path. This is because in IP, packets may typically be for real-time communication, such as telephone conversations and the like, and if such packets take different routes from source to destination there will likely be problems with latency and dropping of data packets. Packets will not typically arrive in order if traveling by different routes, and therefore may not be properly reassembled at the destination. Also, packets arriving out of order are commonly dropped, and the dropped packets must be resent. This wastes bandwidth, lowers throughput, and delays delivery.

Figure 4:
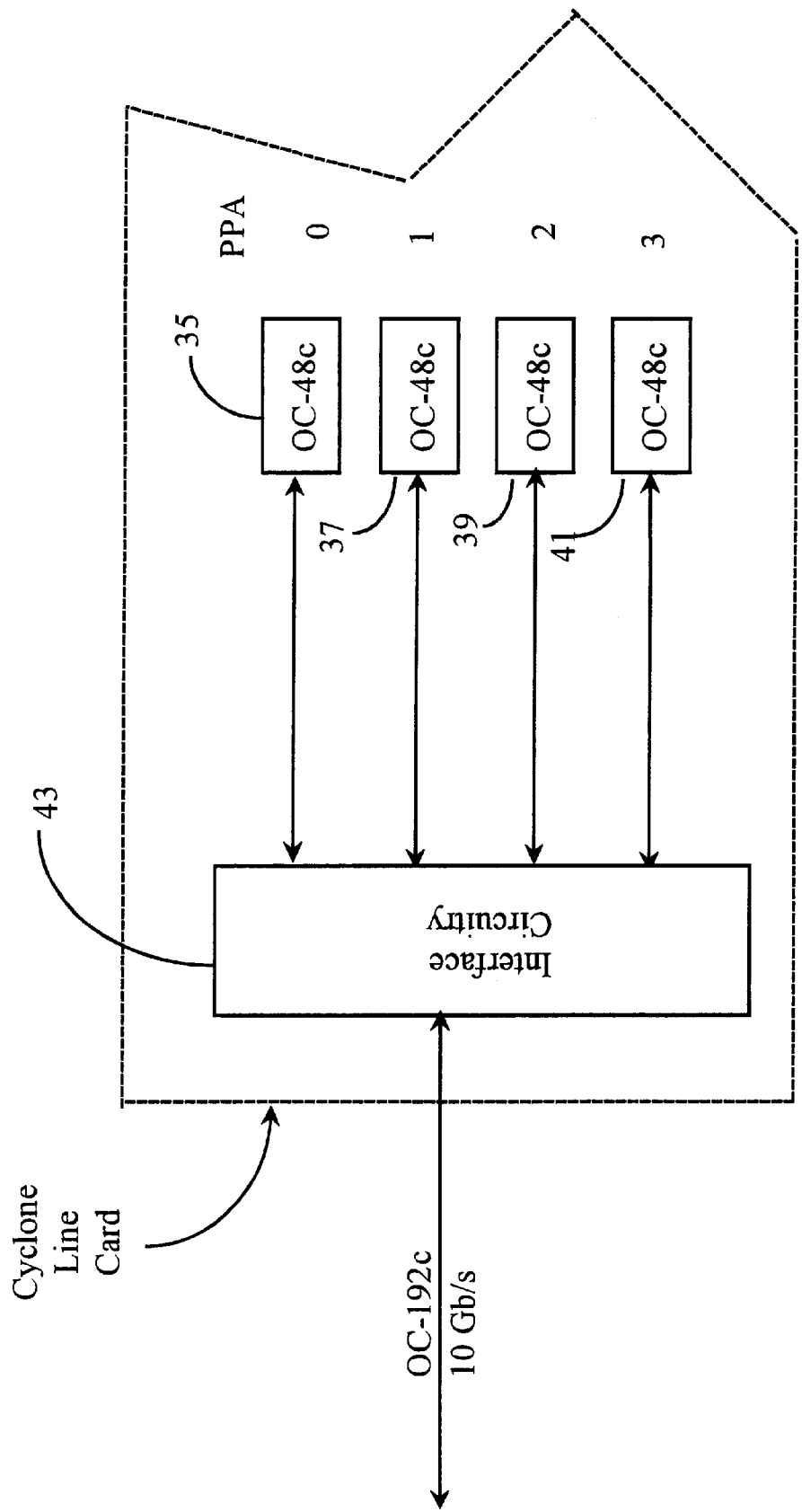
FIG. 4 is a diagram illustrating an interface according to an embodiment of the present invention.

FIG. 4 is a diagram illustrating an interface according to an embodiment of the present invention. In this schematic OC-192c line 33, operating at up to 10 Gb/s, interfaces to four OC-48c PPAs 35–41 through a unique hardware interface 43. In a preferred embodiment of the present invention block 43 is implemented as a single ASIC. In other embodiments block 43 may be a chip set, and in still other embodiments there may be a microprocessor and firmware employed to accomplish the functionality of block 43 as described in further detail below.

Figure 5:
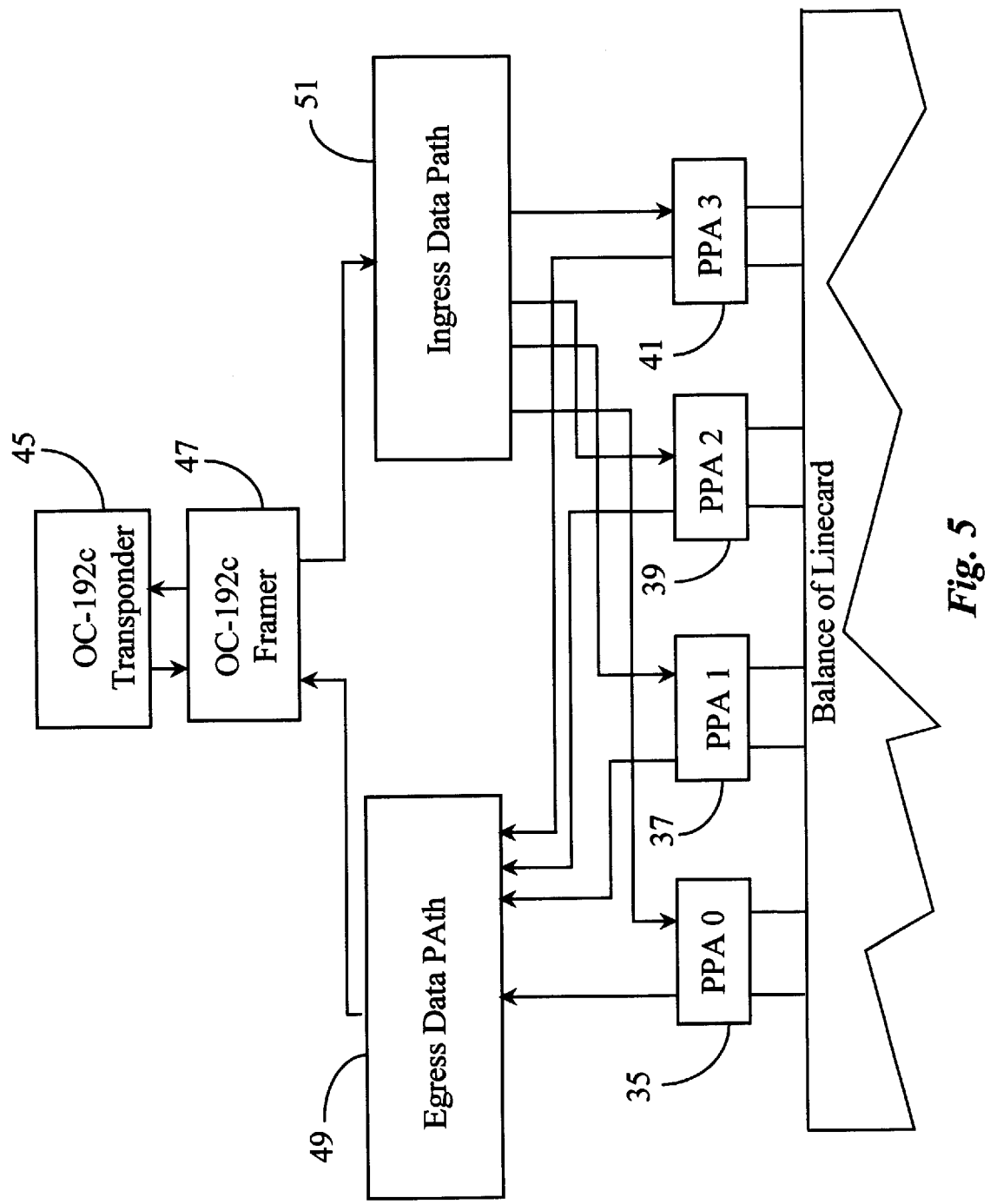
FIG. 5 is a more detailed block diagram encompassing block 43 of FIG. 4 interfacing to OC-48c ports.

FIG. 5 is a block diagram illustrating additional elements and interconnectivity for interface circuitry 43 of FIG. 4. In FIG. 5 packets coming into interface circuitry 43 arrive and leave an OC-192c transponder 45. Packets are exchanged between the transponder and an OC-192c. framer 47. Both transponders and framers are circuit elements well-known in the art. In the case of packets coming into a line card and transferred from the OC-192c framer 47 into and through an Ingress data path 51 and then to PPAs 0 through 3. Packets from the line card exiting to an OC-192c line go from PPAs 0 through 3 through an Egress data path 49, and then to the OC-192c framer 47, then to the line. The handling of ingress and egress packets is necessarily somewhat different, which is the motivation for the different Egress and Ingress data paths.

Figure 6:
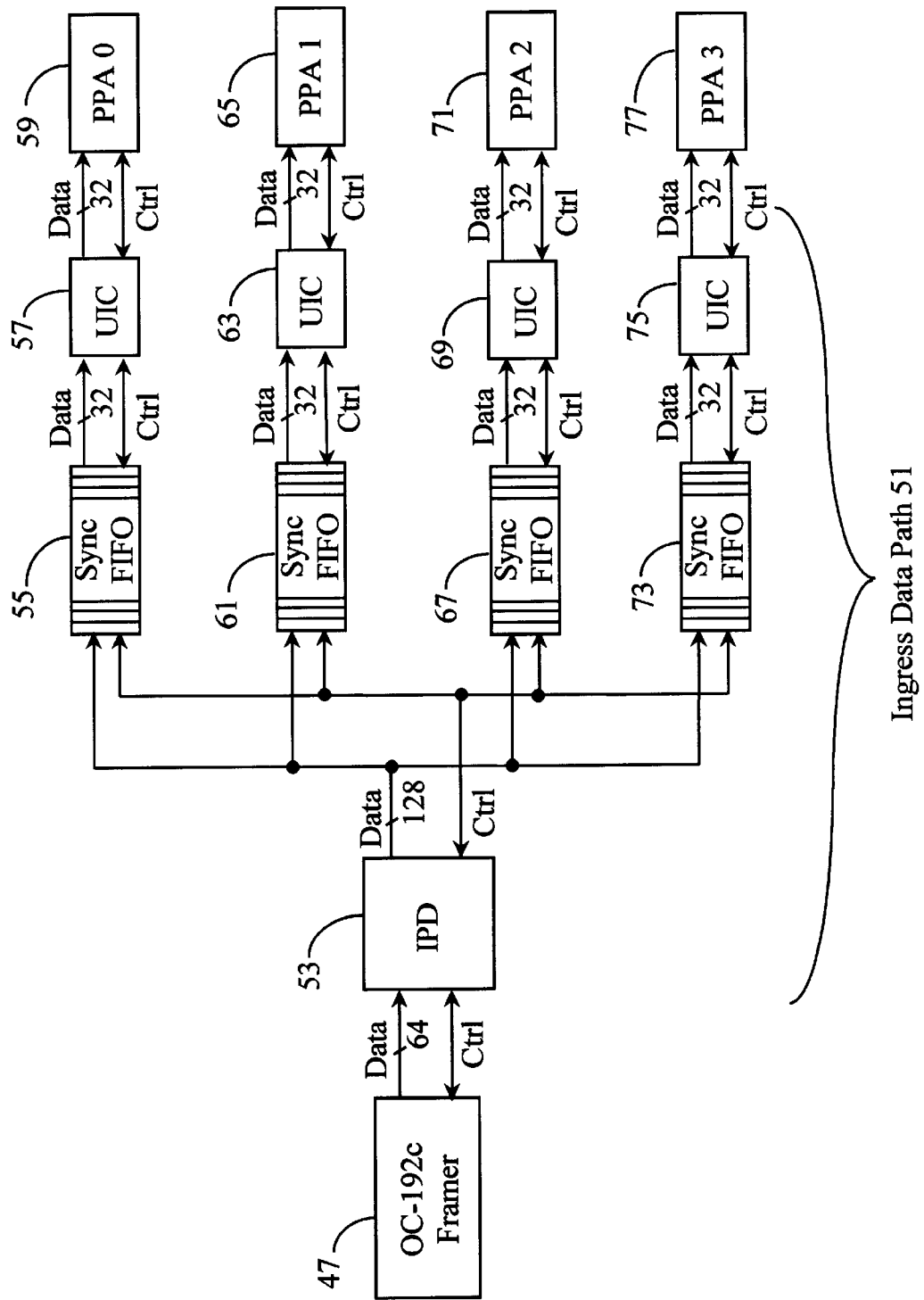
FIG. 6 is a diagram of elements in the Ingress Data Path of FIG. 5.

FIG. 6 is a block diagram of ingress data path 51 from FIG. 5. Ingress packets received from OC-192c framer 47 arrive at a rate that is four times faster than a single PPA can handle. Ingress logic needs to evenly disperse the incoming packets over the four PPAs 59, 65, 71 and 77 on the line card to keep up with the incoming traffic. Dispersion of the packets also needs to be balanced in order to keep any one PPA from being overloaded with packets, and to maximize the overall through put. Since no dispersion scheme: round robin, linear, or any other, is perfect, buffering memory is required in each separate path to a PPA, and there are therefore four synchronous first-in first-out buffers; one in each path, these being buffers 55 associated with PPA 59, buffer 61, associated with PPA 1, buffer 67, associated with PPA 71, and buffer 73, associated with PPA 77. The purpose of the buffering memory in each path to a PPA is to even out any temporary unevenness encountered in the dispersion technique, described in more detail below.

Referring again to FIG. 6, there are two new and unique elements in the data path, an Ingress Packet Demultiplexor (IPD) 53, and four separate Utopia Interface Converters (UIC). The function of the IPD will be first explained. As seen in the exemplary block diagram there are data bus and control connections between the elements of the Ingress Data Path.

One important function of the IPD is to map incoming packets into the four separate FIFO buffers 55–73. It is desirable, as before stated, that IP packets having the same source/destination pair be all routed by the same physical path, and it is further desirable that a creditable job of load-balancing be done as well.

Figure 7:
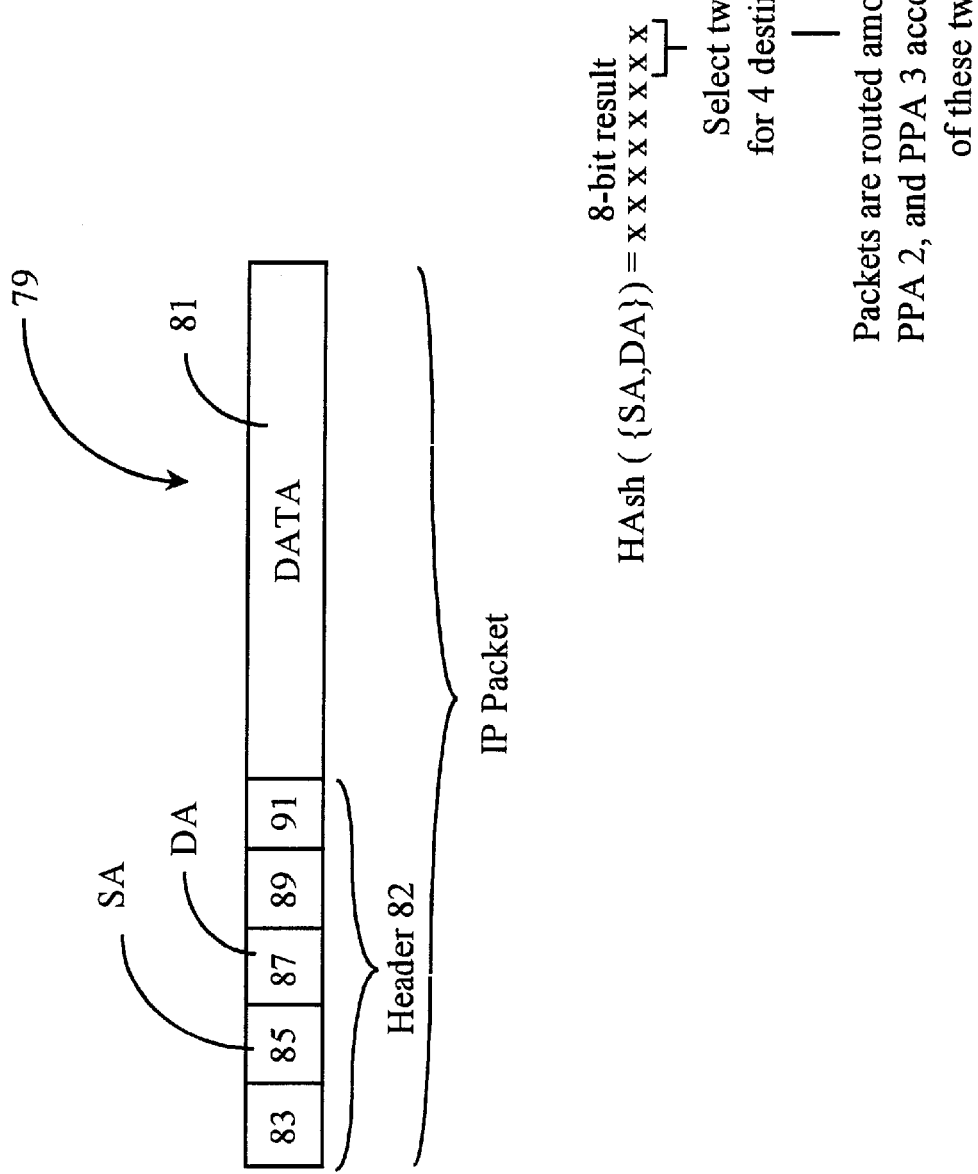
FIG. 7 is a diagram of an IP data packet indicating a unique method for routing such packets.

FIG. 7 is a generalized diagram of an IP data packet 79 in the art. In IPv4 protocol there is a data portion 81 and a header portion 82 comprising five header fields 83 through 91. Amongst the five fields are a source address (SA) and a destination address (DA). Given an SA/DA pair, the IDP applies a hash function do determine a unique bitmap for each SA/DA pair, so that all packets with a common SA/DA pair will result in the same bitmap. As there are but four destinations, FIFOs 55, 61, 67, and 73, the IDP need only consider any two bits of the result of the hash. In a preferred embodiment the two bits considered are the two least significant bits. Packets are then routed to buffers 55, 61, 67 and 73 according to these two selected bits, unique and common for each unique SA/DA pair. Thus, IP packets with the same SA/DA are always routed by a common physical path.

MPLS packets are hashed using up to three labels on the label stack for the packets. All other packets (not IP or MPLS) are hashed according to point-to-point protocol (PPP) code. This keeps common PPP types together by path, and disperses various other PPP types over the four PPAs.

Each UIC in the four separate data paths to PPAs reads packets from the coupled FIFO and passes packets to the associated PPA, in this example, by a UTOPIA III+ interface. The UIC design mimics framer handshaking to PPA interfaces, so there needs be no alteration of the PPAs to accommodate the data transfer.

In most cases, because the input to a line card such as described herein will be from a large number and wide variety of sources communicating with a similarly wide variety of destinations, the load-balancing provided by the IDP will be quite good. In some cases, however, for any of a number of reasons, there will be data surges and bursts that will tend to overload a particular FIFO.

In another aspect of the invention the IDP has a further function in load-balancing. This further function is provided for the unusual circumstance of sudden or sustained overload as described immediately above. The IDP has reference to, in a preferred embodiment, a programmable threshold relative to the momentary load content of each FIFO. During those periods when all FIFOs are functioning below threshold, the load balancing by hashing will be considered adequate. If a threshold is exceeded, however, and preferably before packets are ignored or dropped, the IPD will spill packets from the threatened FIFO to a FIFO less loaded. This is done in one embodiment on a round-robin basis so redirected packets will go by the next path in order for which it is found that the threshold is not exceeded.

Figure 8:
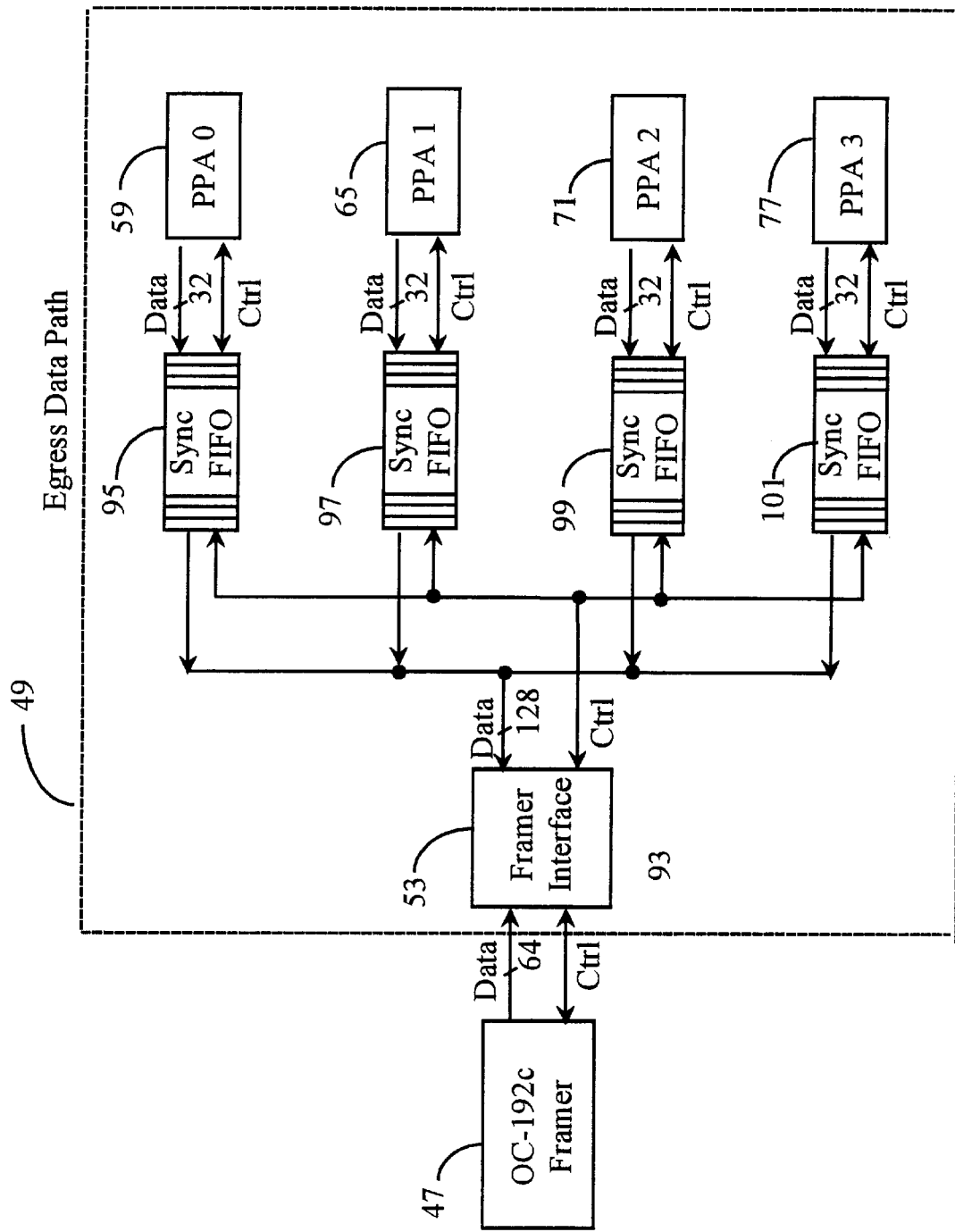
FIG. 8 is a diagram of elements in the Egress data path of FIG. 5.

FIG. 8 is a block diagram of Egress data path 49 of FIG. 5. The elements in this example are a framer interface 93, and four FIFO buffers 95, 97, 99 and 101. In a preferred embodiment there are four FIFOs 95, 97, 99 and 101, each interfaced to a PPA from 0 to 3. The FIFOs are for temporary storage to have an entire packet before being read by a frame interface 93 to be sent to framer 47. Interface 93 reads the FIFOs in a round-robin scheme in this embodiment, skipping any FIFO not having a complete packet. Since the frame interface is four times as fast as the PPA interface, each FIFO needs only enough capacity to store only two maximum size packets.

A major advantage of the unique circuitry and connectivity described in embodiments above is that relatively uncomplicated additions, being the egress and ingress circuitry and the control blocks described above (IPD, UIC and framer interface) can be added to a line card developed for OC-48c handling, providing a card for interfacing to an OC-192c line, while also balancing data flow and ensuring that IP pa having the same SA/DA pair are routed by a constant path.

It will be apparent to the skilled artisan that the embodiments described are exemplary, and that there may be considerable alterations in the embodiments described while not deviating from the spirit and scope of the present invention. It is desirable that functionality in a preferred embodiment of the invention be implemented as hardware, with a minimum of software-based functionality. This is not, however, limiting to the application and practice of the invention, and software functionality may be used more extensively in many embodiments. The invention should be accorded the breadth of the claims that follow:

What is claimed is:

1. In a data packet router, a line card for interfacing to a standard data link having a first transmission capacity, comprising:
    a first portion interfacing to the router and having a plurality of ports or packet processing engines each with a transmission capacity less than that of the standard data link; and
    a second portion having a framer compatible with the standard data link coupled to the standard data link, an ingress and an egress data path between the framer and the slower ports or engines, each with separate ingress buffers and egress buffers for each slower port, and an interface control circuit controlling data packet transfers between the slower ports and the framer in both directions by extracting a key from incoming packets from the standard data link, processing the extracted key for each packet, and using selected bits of the result to map the packet to an individual one of the slower ports.

2. The line card of claim 1 wherein the standard data link is one of OC-192c-compatible or 10 Gigabit Ethernet compatible, and the slower ports are OC-48c ports.

3. The line card of claim 1 wherein the processing is by a hashing function.

4. The line card of claim 1 wherein the key for an incoming Internet Protocol (IP) packet is the source address, destination address (SA/DA) pair, producing a unique result, such that all packets having a common SA/DA pair are routed by the same slower port, using a selected pair of bits from the result.

5. The line card of claim 1 wherein labels of multi-protocol label-switching (MPLS) packets are processed to map MPLS packets to the slower ports.

6. The line card of claim 1 wherein packets other than Internet Protocol (IP) and multi-protocol label-switching (MPLS) packets are processed by point-to-point protocol (PPP) code.

7. In a data packet router, a line card for interfacing to a standard data link having a first transmission capacity, comprising:

a first portion interfacing to the router and having a plurality of ports or packet processing engines each with a transmission capacity less than that of the standard data link; and a second portion having a framer compatible with the standard data link coupled to the standard data link, an ingress and an egress data path between the framer and the slower ports or engines, each with separate ingress buffers and egress buffers for each slower port, and an interface control circuit controlling data packet transfers between the slower ports and the framer in both directions;

wherein the egress buffers are provided in a capacity to hold at least two maximum-size packets, and the control circuit pulls a packet from a buffer for the framer only if the buffer contains a complete packet.

8. A method for enabling a data packet router line card having a plurality of ports or packet-processing engines to receive on a data link having a capacity greater than the capacity of any one of the ports, comprising the steps of:

(a) adding a framer to the card for coupling to the data link;

(b) coupling the framer to slower ports through an interface control circuit and buffers dedicated one-to-one to each port;

(c) extracting a key from each incoming data packet; and (d) using the key with a hashing function to map each packet to an individual ingress buffer, and hence to an individual port, the hashing function producing a unique bit map for each extracted key, specific bits of the bitmap selected and used to map the packet.

9. The method of claim 8 wherein the plurality of ports are each SONET OC-48c compatible, and the data link is OC-192c compatible or 10 Gigabit Ethernet compatible.

10. The method of claim 9 wherein the hash key for an incoming Internet Protocol (IP) packet is the source address, destination address (SA/DA) pair, producing a unique hash result, such that all packets having a common SA/DA pair are routed by the same port, using selected bits from the hash result.

11. The method of claim 9 wherein labels of multi-protocol label-switching (MPLS) packets are hashed to map MPLS packets to the ports.

12. The method of claim 9 wherein packets other than Internet Protocol (IP) and multi-protocol label-switching (MPLS) packets are hashed by point-to-point protocol (PPP) code.

13. A method for enabling a data packet router line card having a plurality of ports or packet-processing engines to receive on a data link having a capacity greater than the capacity of any one of the ports, comprising the steps of:

(a) adding a framer to the card for coupling to the data link;

(b) coupling the framer to slower ports through an interface control circuit and buffers dedicated one-to-one to each port;

(c) extracting a key from each incoming data packet; and (d) using the key with a mapping function to map each packet to an individual ingress buffer, and hence to an individual port;

wherein the framer is also coupled to the ports through individual egress buffers each having a capacity to hold at least two maximum-size packets, and wherein the control circuit pulls a packet from an egress buffer for the framer only if the buffer contains a complete packet.

* * * * *